Jan. 3, 1967  C. F. WOLFENDALE  3,296,522
ANGULAR POSITION TRANSDUCER EMPLOYING
A CAPACITIVE POTENTIOMETER
Original Filed Oct. 25, 1962  3 Sheets-Sheet 1

CALEB FREDERICK WOLFENDALE
INVENTOR

BY

ATTORNEY

Jan. 3, 1967  C. F. WOLFENDALE  3,296,522
ANGULAR POSITION TRANSDUCER EMPLOYING
A CAPACITIVE POTENTIOMETER
Original Filed Oct. 25, 1962  3 Sheets-Sheet 2

CALEB FREDERICK WOLFENDALE
INVENTOR

BY

ATTORNEY

Jan. 3, 1967     C. F. WOLFENDALE     3,296,522
ANGULAR POSITION TRANSDUCER EMPLOYING
A CAPACITIVE POTENTIOMETER
Original Filed Oct. 25, 1962     3 Sheets-Sheet 3
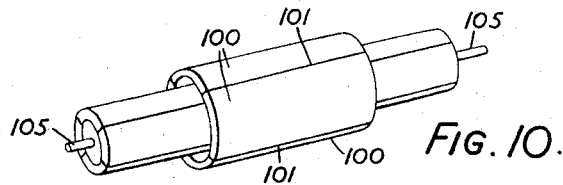
FIG. 10.
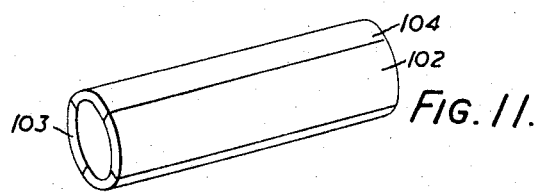
FIG. 11.
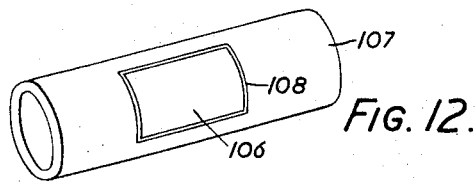
FIG. 12.
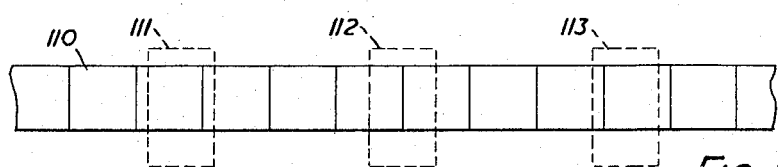
FIG. 13.
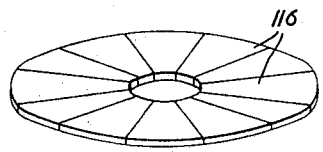
FIG. 14.
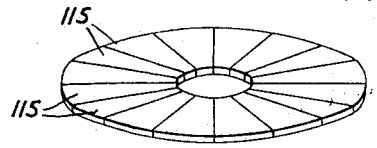

United States Patent Office 3,296,522
Patented Jan. 3, 1967

3,296,522
ANGULAR POSITION TRANSDUCER EMPLOYING A CAPACITIVE POTENTIOMETER
Caleb Frederick Wolfendale, London, England, assignor to Sogenique (Electronics) Limited
Continuation of application Ser. No. 232,943, Oct. 25, 1962. This application Dec. 7, 1965, Ser. No. 512,829
Claims priority, application Great Britain, Oct. 27, 1961, 38,527/61
10 Claims. (Cl. 323—93)

This invention relates to position responsive apparatus and to capacitive potentiometers for use in such apparatus.

This application is a continuation of applicant's copending application Ser. No. 232,943 filed October 25, 1962, now abandoned.

More particuarly the invention relates to an apparatus in which the potentiometer comprises a series of elements, arranged in line, the line being straight or curved as may be appropriate, the elements of the series being energised from a suitable source of alternating potential so as to establish an electric field along the line of elements. A pick-off or interpolating electrode is arranged adjacent and movable relative to the elements of the series and in this way there is induced on the electrode a potential, with respect to a reference point, that is indicative of the relative position of the electrode and the elements. An apparatus of this kind is described in more detail in United States Patent No. 3,071,758.

An apparatus of this kind has exceptional properties. The inherent properties of the electrical system are such that the ultimate sensitivity is much higher than is required for all normal metrological requirements and is equal to or better than that of optical systems. In practice, with relative simple constructions of the potentiometer a sensitivity of a few microinches or better can be readily attained.

The present invention is concerned with improvements in the construction of potentiometers for use in apparatus of this kind for measuring angular displacements, the improvements being directed to arrangements by which the effects due to mechanical features or inevitable imperfections of the potentiometers are reduced or eliminated.

The invention relates to a position responsive apparatus comprising a capacitative potentiometer including a series of elements arranged effectively in line, means for applying different alternating current potentials to said elements, a relatively moving electrode system comprising a plurality of pick-off electrodes adjacent said elements and means responsive to the voltage induced on the electrodes of said system.

The invention includes an angular position responsive apparatus comprising a series of conductive elements arranged effectively in an arcuate line about an axis, a source of alternating potential, and means for impressing different alternating potentials upon at least three of said elements thereby to establish an alternating field along the length of the line of said elements, an electrode system mounted for relative movement with respect to said elements in a desired arcuate path about said axis and including a plurality of electrodes adjacent said elements said electrodes being electrically connected and means responsive to a voltage induced on said electrodes with respect to a voltage reference point of said source, said electrodes being disposed to reduce the effect of the induced voltage of movement of said electrodes in a direction other than said desired direction.

Features and advantages of the invention will appear also from the following description of embodiments thereof, given by way of example, in conjunction with the accompanying drawings, in which:

FIGURE 10 is a diagrammatic perspective view of another form in accordance with the present invention;

FIGURES 11 and 12 are diagrammatic perspective views of forms of interpolating electrodes in accordance with the present invention;

FIGURE 13 is a diagram indicating a principle of electrode arrangement, and

FIGURE 14 is an exploded diagrammatic perspective view of an angular potentiometer using the principle of FIGURE 13 in accordance with the present invention.

Figure 1:
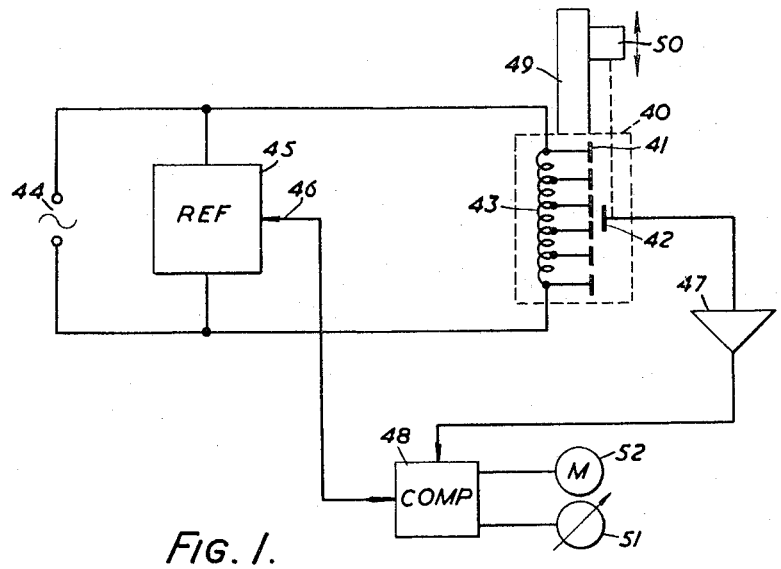
FIGURE 1 is a simplified diagram showing the general arrangement of a position-response apparatus.

FIGURE 1 is an example of a simple position-responsive or control arrangement; this is an example only of a suitable arrangement and others are to be found in Patent 3,071,758. The apparatus shown in FIGURE 1 includes a capacitative potentiometer indicated generally by the broken line rectangle 40 and including a series of adjacent conductive elements 41, with insulating separators (not shown) between adjacent elements. As shown in FIGURE 1 the elements are arranged in a straight line, but this is not necessarily so, as will be apparent hereinafter.

Associated with the line of elements 41 is a pick-off or interpolating electrode system shown diagrammatically as an electrode 42; this electrode is spaced from and insulated from the elements 41; the electrode system 42 can be moved along or with respect to the line of elements 41, and in doing so will present a capacitance between it and the adjacent one or ones of the elements.

Different potentials are established along the series of elements 41, the means for this purpose consisting conveniently of a tapped inductive element 43, connected to an alternating current source 44. In this way successively increasing potentials are impressed upon the elements of the series, and hence, as the pick-off electrode moves along the elements of the series there will be induced on it a voltage indicative of its position relative to the elements.

The voltage thus induced can be related to the voltage at a reference point; for example a reference potential can be obtained from a reference voltage device 45 energised from source 44. In a very simple arrangement the reference point could be a tap on the inductive element 43, but as it will usually be desired to vary the voltage of the reference point finely and with precision, it is preferable to use other means affording a fine control of voltage. A tapped inductive element can be used or preferably a sequence of such elements, in the manner described in the copending application referred to, so as to enable the reference point to be selected with successive scales or decades of accuracy. The means for varying the reference point is indicated diagrammatically at 46 in FIGURE 1.

The alternating current potential produced on the pick-off electrode 42 is fed, through amplifier 47, to one input of a voltage comparator 48, to the other input of which is fed a voltage from the reference point 46.

Where the potentiometer is being used as part of an arrangement for indicating the position of a movable element, that movable element is coupled to the pick-off electrode 42 so as to cause the electrode to move along the line of elements 41.

For example, if the apparatus is being used in connection with a machine tool, the potentiometer might be connected to the bed of the machine, as indicated diagrammatically at 49 in FIGURE 1, the moving electrode 42 being coupled to or associated with the tool slide 50 so as to move with it.

The relative position of the two parts 49 and 50 can be indicated by an indicating instrument 51 which is connected to the output of comparator 48. This is a convenient method of indicating position, but is not highly accurate as it depends upon the constancy of output of source 44. A far greater accuracy is attainable by taking advantage of the fact that the circuit is a bridge circuit and, for any given position of electrode 42 adjusting the reference voltage until bridge is balanced, as indicated by the null reading of meter 51.

Where the potentiometer forms part of an arrangement for controlling the position of the movable element, the arrangement is substantially similar to that just described, but with the difference that the deviation signal output from comparator 48 is used to control either directly or indirectly the operation of a reversible motor 52 which serves to drive the movable element 50 and therefore also the electrode 42 in a correcting sense. A null-seeking arrangement is used, so that when the deviation signal falls to zero the motor stops; the movable element will then be in the desired position.

Figure 2:
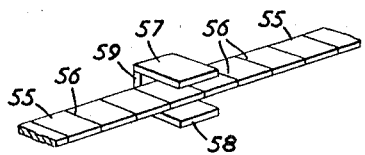
FIGURES 2, 3 and 4 are diagrammatic perspective views of three forms of linear capacitative potentiometers.

FIGURE 2 shows a potentiometer which consists of a number of flat rectangular conductive elements 55, arranged in end-to-end relation, so as to form a straight line of elements, the adjacent elements being insulated by interposed insulating spacers 56. The pick-off electrode consists of two electrode elements 57 and 58, one above and one below the line of elements, joined by a support member 59. The pick-off electrode thus formed is balanced, and the effect of any slight variations in output due to movements or change of angle of the electrode with respect to the line of elements, in a direction at right angles to the direction of measurement, that is, along the line of the elements, is substantially reduced. This is an important advantage in practice.

Figure 3:
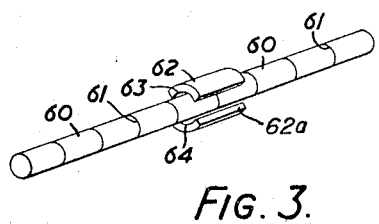
Figure 4:
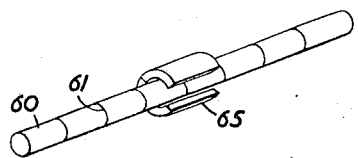

FIGURE 3 is an arrangement which has a similar advantage; in FIGURE 3 the potentiometer elements are short cylinders 60 secured together in line with interposed insulating members 61; the cylinders are preferably hollow, to accommodate appropriate connections to the elements. The pick-off element of the potentiometer includes two members 62, 62a, arranged one on each side of the line elements 60. The conductive faces 63, 64 of the members adjacent the line of elements 60 can be cylindrical and concentric with the surfaces of the elements, or they can be flat as in FIGURE 2. The two members can be combined into a single member as shown at 65 in FIGURE 4.

Figure 5:
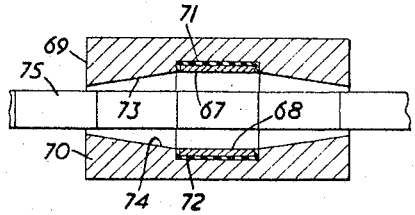
FIGURES 5 and 6 are longitudinal sectional views of two forms of linear capacitative potentiometers using guard electrode structures.
Figure 6:
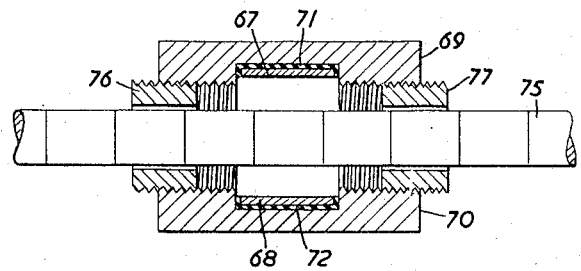

FIGURES 5 and 6 of the drawings show arrangements of pick-off or interpolating electrodes using guard electrodes. In FIGURE 5 the pick-off electrodes are shown at 67, 68, mounted in a housing 69, 70, of conductive material; the electrodes are insulated by means of insulation indicated at 71, 72. The inner surfaces of the housing are tapered as at 73, 74, in the outward direction, so that the housing more closely approaches the surface of the elements than electrode 67, 68; this gives good electrostatic shielding of the electrode. The cross-sectional shape of the housing will depend upon the shape of the elements 75; if the latter are cylindrical in cross-section as in the construction of FIGURES 3 and 4, then the housing 69, 70 can have a corresponding circular cross-section, and it may then be convenient for electrodes 67, 68 to be made in the manner indicated in either FIGURE 3 or FIGURE 4. The appropriate potential can be impressed upon the guard electrode by means which are described in United States application Ser. No. 140,874, filed September 26, 1961.

A similar arrangement is shown in FIGURE 6, but in this construction the guard electrodes 76, 77 are made adjustable with respect to electrodes 67, 68. As shown, the electrodes 76, 77 are formed as screwed plugs which can be inserted to a greater or lesser extent into the housing 69, 70. In addition to the electrodes serving as guard or shielding electrodes, they provide a means of adjusting the effective length of electrodes 67, 68.

The potentiometer elements need not be disposed linearly, and the invention can be applied to angular-position responsive apparatus, to give a very highly accurate indication of angular position or extent.

Figure 7:
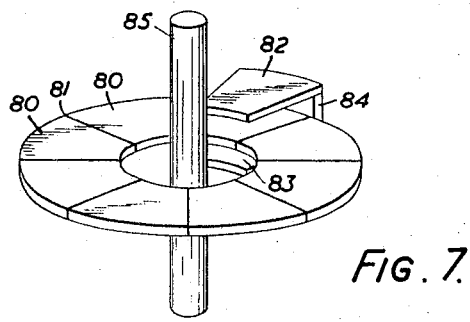
FIGURE 7 is a diagrammatic perspective form of one form of angular potentiometer in accordance with the present invention.

FIGURE 7 is an example of a non-linear arrangement of the elements of the potentiometer. In FIGURE 7 the elements 80 are formed as segments of an annulus, with interposed insulating means 81; the pick-off elements, comprising two members 82, 83 are arranged one above and one below the annulus. The members 82, 83 are joined by a support 84. The electrodes and the elements are arranged for relative angular movement, and one assembly, conveniently the pick-off electrode, is mounted upon shaft 85.

Figure 8:
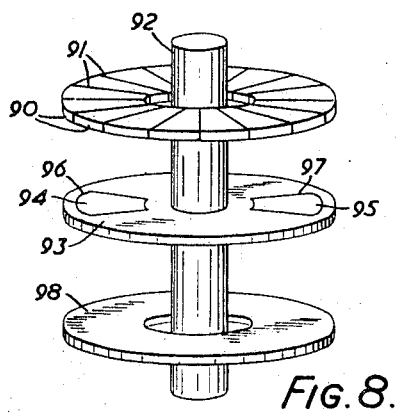
FIGURE 8 is a diagrammatic perspective view of a further form of angular potentiometer in accordance with the present invention.

The use of two electrodes 82 and 83 in the construction of FIGURE 7 reduces errors due to relative movement of the electrodes in the direction at right angles to the plane of the elements; FIGURE 8 shows an arrangement by which any errors due to lateral movement of shaft 85 can be reduced.

In this construction there is provided a ring of sector shaped elements 90, which are generally similar to elements 80 of the construction shown in FIGURE 7. The elements are assembled to form an annulus, with interposed insulating material 91. The pick-off electrode is provided by means comprising a shaft 92 carrying a conductive disc 93, in which are two sectors 94, 95, insulated from the remainder of the disc by means of insulation 96, 97. Beneath disc 93 is a stationary annulus 98 also of conductive material. In FIGURE 8, the elements, the disc 93 and annulus 98 are shown in exploded form, and in a practical construction are arranged with their adjacent surfaces close to one another. Consequently, with this arrangement there will be a capacitance existing between sectors 94 and 95 and the adjacent elements 90, and also a capacitance between the sectors 94, 95 and the annulus 98. Potentials are impressed upon the series of elements 90 and as the disc 93 is rotated a varying potential will appear on the element 98, indicative of the position of the disc 93 with respect to the series of elements 90. By appropriate positioning of sections 94 and 95 the effect of lateral movement of the shaft is reduced. It is also an advantage of this arrangement that slip ring or like moving connections to the relatively movable parts of the transducer can be obviated.

Figure 9:
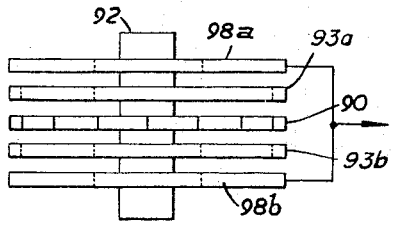
FIGURE 9 is a side elevation of a modified form of the potentiometer shown in FIGURE 8.

A further advantageous modification of the construction of FIGURE 8 is shown in FIGURE 9. In FIGURE 9, a series of elements 90 are provided as before, forming the annular assembly, but a disc similar to disc 93 is provided on each side of this ring of elements, at 93a and 93b. Outside of these two elements are two further rings, corresponding to ring 98, at 98a and 98b. This arrangement is balanced electrically and mechanically, and is largely insensitive to movements of the discs 93a and 93b, except for angular movement about the shaft 92.

The arrangements of FIGURES 7, 8 and 9 can in effect be translated in forms in which the effective surface of the electrodes are cylindrical instead of plane, and electrodes of this nature are indicated diagrammatically in FIGURES 10, 11 and 12.

In FIGURES 10 and 11, the elements 100 are formed as segments of a cylinder with interposed insulation 101; the pick-off electrodes 102, 103 are arranged upon the surface of a cylindrical body 104, mounted upon a shaft 105. A guard electrode arrangement can be adopted; in FIGURE 12 the pick-off electrodes such as 106 are mounted in the surface of a conductive cylinder 107 with interposed insulation 108. The relative positions of the elements and the electrodes in these constructions can be transposed.

A further means of improvement, applicable both to linear and angular type elements resides in the use of multiple electrodes so positioned that transitions from one element to the next do not occur simultaneously with all the electrodes. The diagram of FIGURE 13 illustrates the point. A series of elements 110 co-operate with electrodes 111, 112, 113 which move together; the electrodes being spaced by non-integral multiples of the lengths of the elements, so that the electrodes do not have the same relative position with respect to the adjacent element. In this way non-linearities occurring due to imperfections at the transitions are averaged out. FIGURE 14 shows such an arrangement adapted to respond to angular displacement with a series of elements 115 co-operating with multiple electrodes 116. The manner in which this construction is used will be apparent from the foregoing description. It will be appreciated that with this construction there will be ambiguity as similar voltages will be induced on the electrodes at different positions round the series of elements, but the ambiguous positions are well spaced and any simple mechanical means can be used to resolve the ambiguity.

I claim:

1. In a position responsive apparatus for deriving an output alternating signal the amplitude of which is a function of the relative angular positions of two relatively rotatable members: a capacitative potentiometer including a line of at least three similar separate electrically conductive aligned plates; electrically insulating mount means supporting said aligned plates spaced apart along said line in edge to edge relationship, said line forming at least an arc of a circle; a pick-off electrode system comprising at least two similar electrically conductive pick-off plates and further electrically insulating mount means supporting said pick-off plates in aligned relationship beside said line of plates and capacitatively coupled thereto, with said pick-off plates disposed symmetrically with respect to said arc of a circle; guide means cooperating with said further mount means to support said pick-off electrode system for rotation relative to said mount means about an axis passing through the center of said arc of a circle with said pick-off plates moving parallel to the line of said aligned plates; supply means for energizing said aligned plates with respective different alternating electric signals of successively greater magnitude whereby to establish a progressive change of electric potential along the line of movement of said pick-off electrode means; mechanical coupling means for coupling both said mount means to respective ones of said relatively rotatable member; and electrical connection means for establishing connections between said pick-off plates whereby to derive said output voltage and reduce the effect of movement of said pick-off electrode system transverse to the line of said aligned plates.

2. Apparatus as claimed in claim 1 wherein said aligned plates are formed and disposed as sectors of a planar annulus spaced apart circumferentially of the annulus, and said pick-off plates are formed and disposed as sectors of an aligned planar annulus, parallel to the first.

3. Apparatus as claimed in claim 2, wherein the periodicity of said pick-off plates is substantially different to the periodicity of said aligned plates.

4. Apparatus as claimed in claim 3 wherein the angles subtended by the first said sectors at said axis are substantially different to the angles subtended by the second said sectors at said axis.

5. Apparatus as claimed in claim 2 wherein said connection means includes an annular plate which is aligned with the second said annulus, is disposed on the opposite side of the second said annulus to said aligned plates, and is coupled capacitatively to said pick-off plates.

6. Apparatus as claimed in claim 5 wherein the pick-off electrode system and said annular plate are duplicated by a further electrode structure and a further annular plate disposed with mirror symmetry about the plane of said pick-off plates, said further annular plate being connected to the first said annular plate by said connection means.

7. Apparatus as claimed in claim 1 wherein said aligned plates are formed and disposed as arcs of a cylinder spaced apart circumferentially of the cylinder, and said pick-off plates are formed and disposed as arcs of a co-axial cylinder of greater diameter, said guide means supporting said electrode system for rotation about the common axis of said cylinders.

8. Apparatus as claimed in claim 7 wherein the periodicity of said pick-off plates is substantially different to the periodicity of said aligned plates.

9. Apparatus as claimed in claim 8 wherein the angles subtended at the common axis by said pick-off plates are substantially different from the angles subtended at said common axis by said aligned plates.

10. Apparatus as claimed in claim 7 wherein said pick-off electrode system also comprises a cylindrical electrically conductive plate defining apertures in which said plates are respectively disposed.

References Cited by the Examiner

UNITED STATES PATENTS

| | | | |
|---|---|---|---|
| 1,600,842 | 9/1926 | Philips | 317—250 X |
| 2,527,215 | 10/1950 | Hahn | 323—93 X |
| 2,674,729 | 5/1954 | Carter | 317—253 X |
| 2,892,152 | 6/1959 | Buisson. | |
| 3,002,104 | 9/1961 | Mynall | 323—93 |
| 3,068,457 | 12/1962 | Nevius | 317—253 X |
| 3,146,394 | 8/1964 | Frisch | 323—93 |
| 3,172,023 | 3/1965 | Blasingame | 317—253 X |

JOHN F. COUCH, *Primary Examiner.*

A. D. PELLINEN, *Assistant Examiner.*